US007925549B2

(12) United States Patent
Looney et al.

(10) Patent No.: US 7,925,549 B2
(45) Date of Patent: Apr. 12, 2011

(54) PERSONALIZED MARKETING ARCHITECTURE (75) Inventors: Harold F. Looney, Grosse Pointe Park, MI (US); Mark Jacobson, Seattle, WA (US); Michael J. Redding, Northbrook, IL (US)

(73) Assignee: Accenture Global Services Limited, Dublin (IE)

( * ) Notice: Subject to any disclaimer, the term of this patent is extended or adjusted under 35 U.S.C. 154(b) by 1639 days.

(21) Appl. No.: 11/203,444

(22) Filed: Aug. 12, 2005

(65) Prior Publication Data
US 2006/0074769 A1 Apr. 6, 2006

Related U.S. Application Data (60) Provisional application No. 60/611,001, filed on Sep. 17, 2004.

(51) Int. Cl.
*G06F 17/00* (2006.01)
(52) U.S. Cl. .................... 705/27.1; 705/26.1; 705/14.49
(58) Field of Classification Search .................... 705/27, 705/26, 14
See application file for complete search history.

(56) References Cited

U.S. PATENT DOCUMENTS

| 6,317,718 | B1 | 11/2001 | Fano |
| 6,327,574 | B1* | 12/2001 | Kramer et al. ............. 705/14.66 |
| 6,356,905 | B1 | 3/2002 | Gershman et al. |
| 6,571,279 | B1* | 5/2003 | Herz et al. ..................... 709/217 |
| 6,766,947 | B2 | 7/2004 | Wan et al. |
| 6,912,398 | B1* | 6/2005 | Domnitz ........................ 455/461 |
| 2002/0116274 | A1* | 8/2002 | Hind et al. ....................... 705/23 |
| 2002/0138345 | A1* | 9/2002 | Dickson et al. ................. 705/14 |
| 2002/0165758 | A1* | 11/2002 | Hind et al. ...................... 705/10 |
| 2004/0073918 | A1* | 4/2004 | Ferman et al. .................. 725/34 |
| 2004/0102980 | A1 | 5/2004 | Reed et al. |
| 2004/0103017 | A1 | 5/2004 | Reed et al. |

OTHER PUBLICATIONS

Anatole V. Gershman, et al., "Situated Computing: Bridging the Gap Between Intention and Action," Third International Symposium on Wearable Computing (ISWC '99), Oct. 18-19, 1999, San Francisco.

* cited by examiner

*Primary Examiner* — Robert M. Pond
(74) *Attorney, Agent, or Firm* — Brinks Hofer Gilson & Lione (57) ABSTRACT A personalized marketing architecture use real-time data and explicit customer input to augment marketing segmentation, analysis and video advertisement delivery. Customer behavior, preferences, and intentions are monitored and identified to present real-time video messages. Real-time data may be collected based on the customer's data access permission profile to provide messages on an in-home personal portal or on out-of-home display devices to provide personalized messages in public spaces.

31 Claims, 4 Drawing Sheets

PERSONALIZED MARKETING ARCHITECTURE

PRIORITY AND CROSS REFERENCE TO RELATED APPLICATION

This application claims the benefit under 35 U.S.C. §119 (e) of co-pending provisional application No. 60/611,001, filed on Sep. 17, 2004, which is hereby incorporated by reference in its entirety.

BACKGROUND

1. Field of the Invention

The present invention relates generally to data collection and message presentation systems. In particular, the present invention relates to architecture for presenting a personalized advertising message.

2. Description of the Related Art

Through advertising, messages about the goods and/or services are presented to existing and/or potential consumers. Advertising campaigns present advertising messages in both in-home and out-of-home environments. The in-home environment includes television and radio commercials, direct mailing, leaflets, door-to-door solicitation, internet pop-up advertisements, and telemarketing. The out-of-home environment includes marketing messages presented in public spaces such as roadside billboards, kiosks, visual merchandising and merchandising displays.

Advertisers spend large sums money on advertising campaigns. The campaigns may be targeted to blanket a large audience of existing and/or potential customers of the advertised good and/or service. The campaigns depend on reach and frequency so that advertising messages will be viewed by at least a few potential relevant customers. However, many members of the audience may ignore or rebuke the advertising message. The campaigns are often static and cannot be targeted to specific customers. As a result, advertisers desire to provide entertaining, informative, and relevant advertising to large group of potential customers. However, existing solutions do not provide for real-time data collection and analysis to provide dynamic, targeted content. Existing solutions also do not identify in real-time content to be presented according to real-time data collection.

BRIEF SUMMARY OF THE INVENTION

By way of introduction only, a personalized marketing architecture may include presenting real-time, personalized advertising to targeted customers. The personalized marketing architecture may be achieved by one or more apparatuses, devices, systems, methods, and/or processes.

An embodiment of the personalized marketing architecture enables effective, dynamic advertising with personalized, rich media content. The rich media content is delivered based on real-time, data customer profiles, including customer data and customer input, and business intelligence. The embodiment presents targeted, personalized video advertising message to a consumer. The personalized video advertising may be presented based on data that is collected substantially contemporaneously as the message is presented. The data may collected according to permission or settings provided by the consumer.

The personalized message may be presented on one or more digital displays in the in-home environment and/or in an out-of-home environment. In the out-of-home environment advertising messages are presented on networked video displays located in public spaces. The advertising message may be specified for a such as a computer monitor or television, based on real-time data recorded in the in-home environment. The real-time data may be recorded in the in-home environment based on permissions or settings provided by the viewer).

The personalized marketing architecture region, location, for individual displays with a region or location, and for an individual detected in an advertising environment. In the in-home environment, advertising messages may be presented on a video display may gather, record, and compile data and information in real-time. For example, data related to a potential customer's television viewing habits may be collected, recorded, and/or stored substantially simultaneously as the customer is viewing a television program in which a personalized advertising message is to be presented to the potential customer. The consumer may have the ability to limit the specific data that can be accessed by specific advertisers. Real-time data may provide a basis to determine which advertising message to present, or the content of a specific advertising message to present. The real-time data also may be used to determine how to present an advertising message. Thus, a real-time video message may be dynamically determined or adapted for a particular customer. Customer data such as historical, demographic and traffic data may also be used with the real-time data to provide additional focus for the advertising message.

The foregoing summary is provided only by way of introduction. The features and advantages of the personalized marketing architecture may be realized and obtained by means of the instrumentalities and combinations particularly pointed out in the claims. Nothing in this section should be taken as a limitation on the claims, which define the scope of the invention. Additional features and advantages of the present invention will be set forth in the description that follows, and in part will be obvious from the description, or may be learned by practice of the present invention.

DETAILED DESCRIPTION OF THE INVENTION

A personalized marketing architecture will now be described more fully with reference to the accompanying drawings. In each of the following figures, components, features and integral parts that correspond to one another each have the same reference number. The drawings of the figures are not true to scale.

A personalized marketing architecture may be embodied in many different forms, formats, and designs, and should not be construed as limited to the exemplary embodiments set forth herein. The personalized marketing architecture may be embodied as one or more devices, distributed networks, apparatuses, methods, processes, data processing systems, or software products. Embodiments of the personalized marketing architecture may take the form of electronic hardware, computer software, or a combination of both hardware and software. Accordingly, the personalized marketing architecture may be embodied as electronic components, utilizing a computer program product on a computer-readable storage medium, such as hard disks, CD-ROMs, optical storage devices, or magnetic storage devices.

Figure 1:
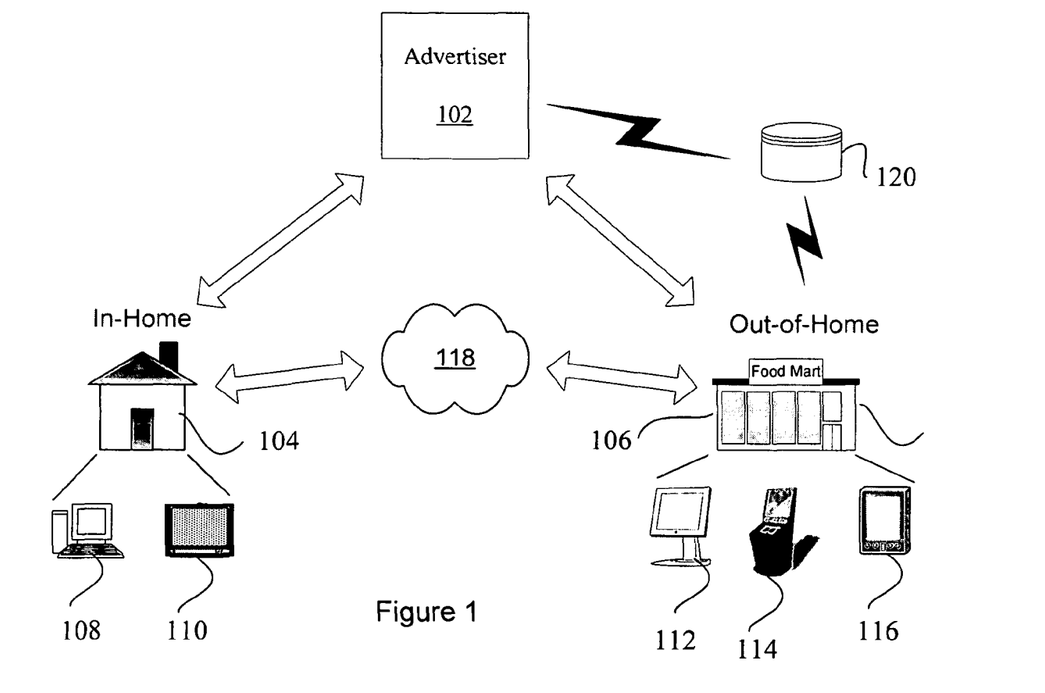
FIG. 1 illustrates an exemplary environment for a personalized marketing architecture.

FIG. 1 illustrates an exemplary electronic network environment for a personalized marketing architecture. An advertiser server or computer host 102 is configured to present personalized advertising messages to potential and existing customers. The advertiser may be any individual or entity that desires to present messages related to goods and/or services. The advertiser may be a manufacturer, retailer, wholesaler, merchant, broker, distributor, courier, holding company, service provider, vendor, purveyor, dealer, firm, agent or agency, or the like.

The advertiser server 102 may use customer data related to existing or potential customers. The customer data may be used to create, execute and refine personalized advertising messages and campaigns. The customer data may be stored in a database 120 of customer profiles. The customer data may include data related to the customer such as customer purchase history, customer demographics, previous interactions with the customer, account profile, and the like. The consumer may have the ability to limit the specific data that can be accessed by specific advertisers. The customer data may also include other information such as previous and current sales, incentives, or promotions of the advertiser, economic forecasts, inventory and the like.

The advertiser server 102 also may use real-time data to form as a basis for presenting advertising messages. The real-time data may be compiled with or augment the customer data in the customer profile. The real-time data may be collected and stored in the database 120. The real-time data may be behavioral, environmental, temporal and other data or metrics that are presently-available in the advertising climate. The customer profile therefore provides real-time information relevant to particular customers. The customer profile may be used to provide a targeted message to a customer. The personalized advertising messages may be designed to maximize return on investment (ROI) for the advertiser. The real-time video advertising campaign may thereby provide a customer-centric campaign scenario.

The advertiser server 102 may be configured to present advertising messages in an in-home environment 104. In an embodiment, the advertising message is presented on a digital display or monitor such as an electronic data processing device 108 or television 110. The advertiser 102 may also present advertising messages in an out-of-home environment 106. The out-of-home environment 106 includes public areas such as retail stores, malls, outlets, warehouses, town centers, transportation depots, thoroughfares, libraries, parks, or any common areas. The advertising message may be presented on a monitor 112, such as a large screen video display, a kiosk 114, a personal digital assistant 116, a mobile telephone, or shopping assistant, or the like. For example, the shopping assistant may be configured as described in U.S. Pat. No. 6,317,718 to Fano, and entitled System, Method and Article of Manufacture for Location-Based Filtering for Shopping Agent in the Physical World, and/or U.S. Pat. No. 6,356,905 to Gershman et al., entitled System, Method and Article of Manufacture for Mobile Communication Utilizing an Interface Support Framework, both of which are hereby incorporated by reference in their entirety.

In an embodiment of a personalized marketing architecture, an advertiser server 102 communicates advertising messages through a network 118. The advertising messages may be communicated through the network 118 to the in-home environment 104 and the out-of-home environment 106. The network 118 may be any group of distributed computers or data processing devices that are connected by communications through permanent wired communications facilities such as cables or through wireless communications. The network 118 may be a local area network, a wide area network, a virtual private network, or a publicly accessible distributed network such as the Internet. The advertiser server 102 also may communicate advertising messages through other communications mechanisms, such as satellite communications, wired and wireless telephone communications, cable communication and television broadcasts and the like.

In an embodiment, the advertiser server 102 may transmit personalized advertising messages to a place of business for the advertiser, and therefore, the advertiser's place of business may also be considered to provide the out-of-home environment 106. For example, a retail store may include a server or host computer 106 configured to present personalized advertising messages to various display devices viewable by its customers. The retail store server 106 also may provide services that are available on a website that is accessible through the network 118. The customer may access the store's Internet website from a remote computer such as a computer located at the customer's home 104.

The website provides information related to goods and services provided by the store. The customer may view information such as account information, previous purchases, or purchase history, informational or instructional videos, product catalogs, advertisements, shopping lists and wish lists. The customer may order products and/or services, create a shopping list, modify a previously created shopping list, and research products and/or services. The customer also may view request information related to specific products and may review videos related to those products. The consumer may also have the ability to limit the specific data that can be accessed by specific advertisers.

A store server 106 may employ the personalized marketing architecture to provide personalized advertisements to customers of the store. The store server 106 may collect customer and real-time data to compile a customer profile 120. The data associated with a customer profile 120 may be collected and provided by a third-party data vendor, the store, the customer, or any combination thereof. The customer profile 120 may be updated or deleted, for example, by a customer accessing the store's website or through providing a credit application.

The customer profile 120 may be stored in a data storage device of the store, a third party data warehouse or the customer. The storage device may be any electronic storage medium capable of being accessed with a data processing device. The storage device may be a loyalty card, a hard drive or memory of a customer and/or store computer, a server, or a network of computers and servers, or any combination thereof.

In an embodiment, the store server 106 collects and stores customer profile 120 including data related to the customer's purchase history, credit, and personal identification information. The customer profile 120 may be used to develop personalized advertising materials and to determine which promotional material to present a customer. The customer profile 120 may be used, for example, to provide personalized advertisements when the customer visits the store 106, or the store's website. The customer profile 120 also may be used to provide personalized advertisements to the customer in the in-home environment 104 such as while the customer views televised programs or listens to radio shows. For example, a personalized advertising message may be presented to the customer while the customer watches a scheduled television broadcast through a set-top box such as a personal video recorder or direct-to-home television service.

Figure 2:
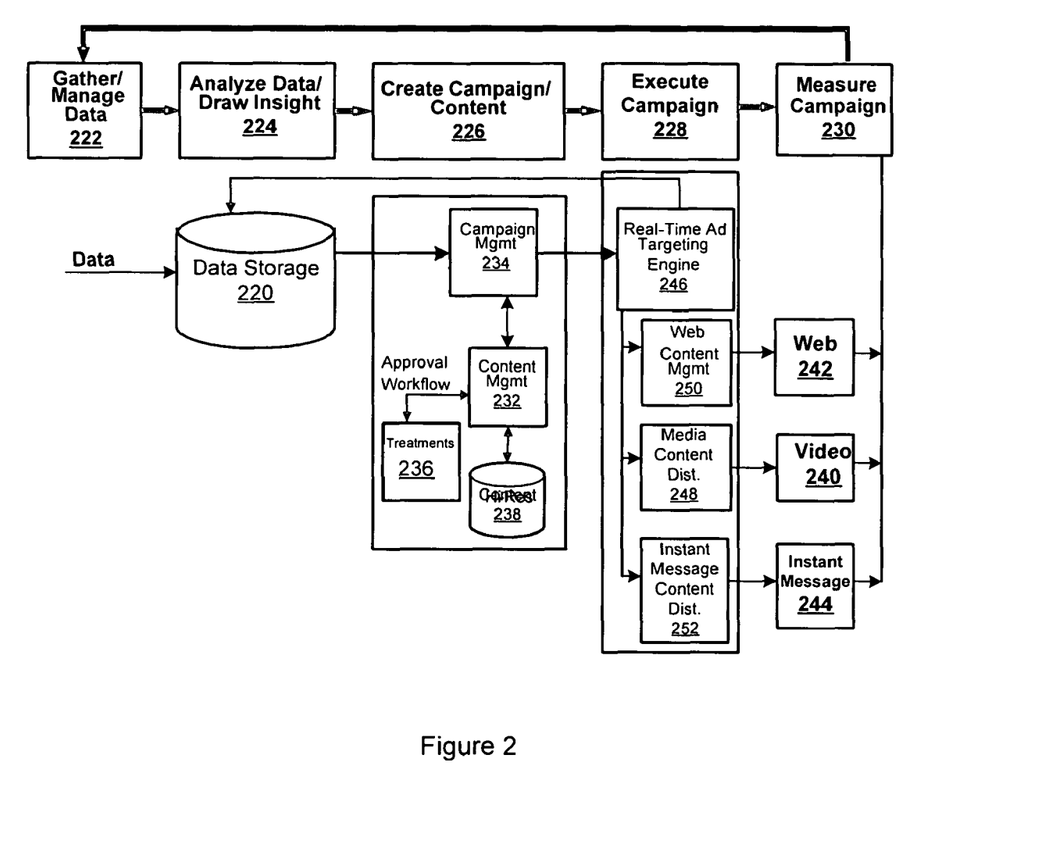
FIG. 2 illustrates an example for a personalized marketing architecture.

FIG. 2 illustrates an example for a personalized marketing architecture 200 that provides a basis for design, development, implementation and maintenance of personalized marketing and advertising strategies. The personalized marketing architecture 200 integrates advertising campaign management, content management, content distribution, customer tracking, and content display technology. The exemplary personalized marketing architecture 200 includes data gathering and management 222, analysis of the data 224, campaign/content creation 226, campaign execution 228, and campaign measurement 230.

In a data gathering and management phase 222, customer data is collected, accumulated, processed, recorded, sorted, stored, and normalized. The customer data may be loaded onto a customer database 220 or customer data warehouse. The customer data may be provided from various sources or collected by an advertiser. The consumer may have the ability to limit the specific data that can be accessed by specific advertisers. The data also may be continually or periodically updated or amended, such as on a weekly, monthly or annual basis. The customer data also may be verified or cleansed to ensure accuracy and consistency. The data also may be transformed into a target format, content or schema.

In an embodiment, customer data is stored in a marketing data warehouse 220. The customer data may include customer preferences, and profile information such as customer personal identification information, customer demographic data, traffic data, historical data, and the like. Historical data may include a customer's past transaction history, account status, and payment history. Traffic data may relate to statistics and records of customer traffic in an advertising environment such as frequency, duration of time spent near a merchandising or video display, and the like.

The personalized marketing architecture also includes means for collecting and recording data and information related to the customer in real-time. The real-time data is recorded on a timely basis and may be updated more frequently that customer data. Real-time data also may relate to a specific customer. The real-time data may be collected and recorded in temporal basis substantially simultaneously as a customer interacts with an advertising environment. The real-time data also may be collected according to permission of the customer to use and/or collect the data. The real-time data provides up-to-date or up-to-the-minute data related to a customer. The real-time data includes feedback and information related to behavior, preferences and intentions of a customer or groups of customers.

The real-time data may be used to calculate or predict what and how to market to a customer. The real-time data may be used with the customer data to focus content of a marketing campaign to present to a personalized advertising message to customers. The real-time data may be used to determine which advertising message is presented. The real-time data also may be used to determine or select the content of a specific advertising message to present. The real-time data also may be used to determine how best to present an advertising message.

In an embodiment, real-time data may be used to augment or supplement a customer profile in the database 220. Customer data and real-time data may be collected by an advertiser, an advertising agency, a third party vendor, a customer data vendor, an analytics service or the like. The database may be maintained by the advertiser or data warehousing services such as Microsoft, Hyperion, Brio, SAS, Teradata and Oracle.

Customer data is combined or compiled with real-time data to create a customer's real-time profile/customer analytic record (CAR). The CAR for a customer or prospective customer may be stored by the database 220. The database 220 may store data for a plurality of customers, where a CAR is developed as a database object to be used to extract, transform, and format customer data for customer segmentation and predictive modeling. A CAR may be a customer record including data that may be used for customer analytics. Examples of CAR applications are described in co-pending U.S. patent application Ser. No. 10/302,337 (U.S. Publication No. U.S. 2004/0102980), filed on Nov. 22, 2002, entitled "Standardized Customer Application and Record for Inputting Customer Data into Analytic Models," which is incorporated herein in its entirety.

The personalized marketing architecture 200 may augment existing customer data analysis. In a data analyzing and insight phase 224, customer and real-time data stored in the customer data warehouse 220 may be transformed or encoded. The data may be transformed or encoded, for example, into a schema suitable for data analysis. Examples of data analyzing and insight are described in co-pending U.S. patent application Ser. No. 10/302,395 (U.S. Publication No. U.S. 2004/0103017), filed on Nov. 22, 2002, entitled "Adaptive Marketing Using Insight Driven Customer Interaction," which is incorporated herein in its entirety. The data from one or more CARs may be extracted according to predetermined transformations. The transforms may allow creation of new variables or real-time data collection that may be dynamically derived. For example, the data may be transformed to provide a real-time CAR used to determine a market trend or customer preferences. The data also may be processed to provide customer scoring models to determine a customer's propensity to respond to a particular promotion, incentive, offer or other advertising message.

In an embodiment, the personalized marketing architecture 200 uses a real-time modeling function. The real-time data also may update a real-time predictive model. In addition, The CAR may be augmented with the real-time data elements. In an embodiment, the real-time modeling function uses real-time data associated with the customer with a scoring model to predict customer behavior such as likelihood for a favorable customer response to a particular offer. The scoring model also may be updated based on customer's response to a real-time offer extension.

In another embodiment, real-time data may augment a retail CAR used to determine what advertisement to present to a television viewer. For example, real-time data related to a customer's present or immediate viewing habits may augment data related to a customer's shared viewing pattern to determine which advertisement to present to a viewer. This data may also be used to associate the viewer with a segment to better target advertising to that customer.

A personalized advertising campaign may be established using campaign/content creation tools 226. A personalized advertising campaign may include marketing strategies that include customer segments, advertising treatments and channel definitions. A customer segment may be established for customers having a relationship based on defining characteristics such as demographic information, past purchases and propensity scores. For example, a customer segment may be defined according to income level, household size, lifestyles, hobbies, careers and interests.

An advertising treatment may include content that is to be presented, including textual, graphic, video, audio, and combinations thereof. An advertising treatment includes marketing material and concepts that are managed through a centralized content management server 232 and referenced by a campaign management system 234. Each customer segment may have one or more advertising treatments applied to them. The treatment may be designated for a fixed number of customers within a fixed number of segments. A channel definition may define how content is delivered. (e.g. instant messaging, direct mail, web content, etc.)

In an embodiment, a treatment 236 may be associated with a specific customer. The treatment may provide input into for a real-time CAR. The treatment 236 may be associated with the customer in real-time. The segment for a customer is also determined in real-time. The segment may be used to determine or select which advertising message, offer, incentive, or promotion to present to the customer. Similarly, the segment may be used to determine or select the content of an advertising message, offer, incentive, or promotion to present.

A centralized content management server 232 manages assets such as advertisements and other marketing materials. The content may be stored in a content database 238. The centralized content management server 232 organizes the assets of a personalized marketing architecture to provide searching, collaboration, approval, ingestion, distribution and access right capabilities of the content.

Development of personalized advertising messages may include efforts of multiple individuals and/or entities. A final product may be created by an advertiser, creative vendors and post production houses. A creative vendor may provide concepts for advertising content including video, photographs, audio recordings, animations, and graphics. Editing and finishing of an advertisement may be accomplished digitally using graphics editors and Video Non-Linear Editors (NLE) on a Macintosh and/or Windows platform. The final advertisement may be provided to the advertiser after approval of a creative director.

In an embodiment of the personalized marketing architecture, a content management server 232 allows collaborative development and deployment of assets such as advertising messages. For example, a creative director and creative vendor may each have networked computer terminals that allow them to share and review work on-line through the content management server 232. A creation process may be optimized with a centralized content management server 232. A creative vendor may import a low-resolution editorial copy into the content management server 232 for approval by a creative director who reviews the copy within the content management server 232 and edits, annotates comments, approves and/or rejects the copy. Access rights to the work may be controlled to limit editorial and viewing rights to the work.

When an asset such as a multimedia advertising message is complete and approved, it may be ingested, transformed, or loaded into the content management system 232 and stored as a high-resolution digital master in the database 238. Metadata may be associated with the work to support real-time delivery of content. Metadata may include data about an advertising message or work. For example, metadata may be definitional data that provides information about, or documentation of, work and may document data about data elements attributes, (e.g., name, size, data type, etc) and records, or data structures (length, fields, columns, etc) and data about data (where the work is located, how it is associated, ownership, etc.). The metadata also may include descriptive information about the context, quality and condition, or characteristics of the data. This metadata may be a unique identifier for the work, as well as metadata used by a real-time advertising targeting engine to select and deliver an advertising message. The work may be located or identified based on searches against the metadata.

The work may also be associated with a treatment 236 such as a marketing or advertising treatment. When an advertiser executes a marketing campaign, the campaign management system 234 may interact with the content management server 232 to retrieve the necessary advertising message based on a search of metadata. The advertising message may be integrated and stored in various formats so that the version of the advertisement that is retrieved has an appropriate format for the advertising medium. For example, if one of the treatments of a marketing campaign is a web banner, the campaign management system 232 may request a version of the work that is appropriate for web delivery. If the treatment includes a video promotion on a public display, the campaign management 232 may request a version that is appropriate for video delivery to a personal video displays.

A content management system 232 may be configured according to the media served. The content management system may be a digital asset management, web content management, and/or document management system. In an embodiment, the personalized marketing architecture 200 uses a digital asset management system to manage the rich media nature of the audio, video, graphics and animation content. Examples of a digital asset management system include Blue Order, Ancept, QDI/Harris, Ancept, Virage (Solution Server), and Convera for audio and video digital assets, and Artesia, Documentum and North Plains for general purpose digital asset management. Asset management provided by Visible World may provide content indexing integrated with Avid video editors to provide real-time components based on a customer profile.

The content management system 232 also may transcode the digital master to create converted media. For example, a broadcast quality 12 Mbps MPEG-2 file may be stored as a digital master for an advertising message. A 300 Kbps Windows media streaming video file may be created on demand from the digital master by transcoding the digital master.

Personalized advertising messages may be presented across multiple channels in a campaign execution 228. For example, the advertising campaign may include presenting messages on video displays 240 such as digital billboards, merchandising displays, personal televisions configured with personal video recorders, video on demand systems, direct-to-home television systems and other video display systems. The advertising message may be presented on a website 242. The advertising message may be displayed as an instant message 244.

The advertising message that is presented may be selected from among various candidate advertising messages. The advertising message may be selected based on the customer's segment, membership in a marketing list, and/or real-time data. Real-time data may be collected and/or recorded substantially simultaneously as the determination for which advertising message to present. In an embodiment, the advertising message to be presented is determined substantially at the time the message is to be presented. The advertising message, and/or the content thereof, may be determined based on a customer segment or membership in a marketing list and real-time data.

The personalized marketing architecture 200 may include a real-time advertisement targeting engine 246. In an embodiment, the real-time advertisement targeting engine 246 identifies and selects a personalized advertising message to be targeted to an individual that will have customer-specific information and content. A customer response to an advertising message may be recorded as insight regarding what offers a customer may respond to, and used as an input for the selection of advertisements. The real-time advertisement targeting engine 246 may present a personalized advertising message by building a real-time CAR, identifying active campaigns, identifying advertising messages within the campaigns, selecting one or more of the active advertising messages, and displaying the advertising message. The real-time advertisement targeting engine 246 may also record responses and provide captured information as feedback data.

The real-time CAR may be built by combining customer data with real-time data. The real-time CAR may be based on current shared viewing habits of an individual, such as the channel and program currently being viewed, viewing patterns, amount of time spent on viewing a channel/program, a specific request from a customer to view a specific advertisement, a rejection of an advertisement, environmental data, the current state of a program such as the score and amount of time remaining in a sporting event, the medium/device from which the customer request is coming, and the like. The real-time CAR includes personal information that may form a basis for presenting a personalized advertising message to the individual.

The real-time advertisement targeting engine 246 may identify an active campaign from which a personalized advertising message may be selected. An active advertising campaign may be identified by comparing advertising campaigns to activation rules. For example, the advertising campaign or advertising messages may be presented at specific times of the day or year. The advertising message may be selected or identified based on a television program being viewed, the location of a video display or any other criteria for selecting or identifying an advertising message.

From the active advertising campaigns, the advertising messages may be selected. For example, the active advertising campaign may have multiple advertising messages or multiple formats of a single advertising message. The advertising message is selected based on viewer qualification for a message. For example, of a subset of advertising campaigns that have been identified as active, the advertising messages of those campaigns for which a viewer qualifies may be identified based on a set of business rules. The business rules may be specified by the advertiser, a vendor, or a marketing agency. The selection rules may include: a greatest likelihood of a customer responding to an advertisement, best or greatest benefit to the advertiser (i.e. highest revenue for a customer response), current inventory levels of a good, availability to provide a service, or any other criteria that the advertiser may use to select an advertising message to present.

After being selected, the advertising message is presented. The advertising message may be displayed to the on a video monitor 240. The video monitor 240 may be a large publicly viewable display such as a digital billboard, or a kiosk. The video monitor 240 also may be a personal display such as an in-home television, a hand-held device, a personal shopping assistant, or the like.

The viewer may interact with the advertising message and input responses to the advertising message. The viewer's response may be captured or otherwise explicitly recorded, such as by allowing the viewer to "click through" an advertisement, or implicitly recorded, such as by measuring viewer response through a specific toll-free telephone number, a URL or other measurement metric. A viewer response may also be monitored, for example, by a video monitor or camera that captures images of a viewer as the advertisement is being presented to the viewer. The video camera also may be used to determine the location of a viewer approaching, near, or in proximity of an advertising display, and the amount of time the viewer remains in a defined proximity zone. The captured information also may be provided as a feedback measure. By providing the customer response as a feedback, the advertising selection and presentation process may be improved or modified.

The real-time advertisement targeting engine 246 may interface the campaign management server 234 and distribution networks. For example, to distribute video advertising messages, the real-time advertisement targeting engine 246 interfaces a video media content distribution network 248. The video content distribution network 248 delivers advertising content to video displays 240. The content includes text, graphics, audio, animation, and video and combinations thereof. The content may be streamed from a database according to a preset order, or may be presented as media clips having an order, arrangement or configuration that is determined based on real-time monitoring and real-time data. For example, one or more video clips may be assembles on-the-fly based on real-time data. The format of the content may be compressed or uncompressed, depending on quality of play-back and the bandwidth. The real-time advertisement targeting engine 246 may interface a web content distribution network 250 to distribute web content and an instant messaging content distribution network to distribute instant messages.

The media content distribution network may include a server. The server may reside locally, such as at the site of the advertising environment, or in a central location. The media server may be a streaming server that delivers real-time content. The media server also may be a bulk content delivery server to provide high volume scheduled deliveries of advertising content.

The server may be a streaming media server or a caching media server. A streaming media server may be located centrally of a distributed network to deliver substantially all advertising content to each video display from a central location. The centralized media server may load balance distributed clusters of streaming media servers. For example, in a distributed solution, a media server may be located in each out-of home environment in which real-time advertisement may be presented. The distributed streaming servers may provide fast response time, allow for scalability, avoid system failure and provide a managed network.

A streaming media server may be used for low quality, highly compressed content and for high quality, minimally compressed content. A media encoder may compress the content to provide a lower quality video that is suitable for delivery on smaller displays like a kiosk and in-home personal portals. Content may also be organized by lists of content that can be streamed by the server, known as a playlist. The playlist may be predetermined or determined based on the real-time data and/or a customer profile. A playlist may include audio, video, static images or other playlists and can be played in a looping or random order. Content can be added or removed from the playlist, such as while the content is being streamed to a client such a as video display. A playlist may be an XML document written in synchronized multimedia integration language 2.0 (SMIL). In an embodiment, a playlist is associated with each predefined segment and is controlled by API calls available in the Streaming Media Server SDK. The API may be encoded in Visual C++, Visual C+, Visual Basic Scripting Edition, and Perl. Examples of streaming media server include Windows Media Service 9 Series (MS Streaming Media Server) and a RealNetworks Helix Universal Server and Gateway. The streaming media server delivers pre-recorded and live video and audio in one or more formats, including MP3, MPEG-4, QuickTime, WinMedia, and RealMedia and may operate with operating systems including Linux, Unix, HP/UIX, IBM/AIX, Solaris, and Windows. High quality video may require a high-end video on-demand (VOD) server, such as Conncurrent MediaHawk VOD Server, Kasenna Mediabase VOD Server and Big Band Broadband Multimedia Service Router. High quality video may be desirable on larger displays such as larger plasma displays.

A Publishing Point may be configured to stream in a Broadcast or On-demand mode. The On-demand mode allows user control over the media stream. Where no direct client control over the stream is used, the publishing points may be configured for broadcast mode. The publishing points delivering content to a kiosks may be configured for on-demand mode since a customer may have control over the content that they may view.

A caching media server delivers content that is stored locally on a video display controller. The video display controller has an optimized playlist based on rules defined by the real-time advertising targeting engine 246. With a caching media server, high quality video and content may be streamed over the network without compression. Caching server include systems by Blue Coat Systems, RealNetworks Cisco, Akamai, Digital Island, and Cidera.

In a measurement phase, the results of or response to the advertising messages may be determined and provided as a feedback to the customer data warehouse where it may be stored for further processing. For example, the feed back may be used to provide further campaign refinements or new campaign creation.

Figure 3:
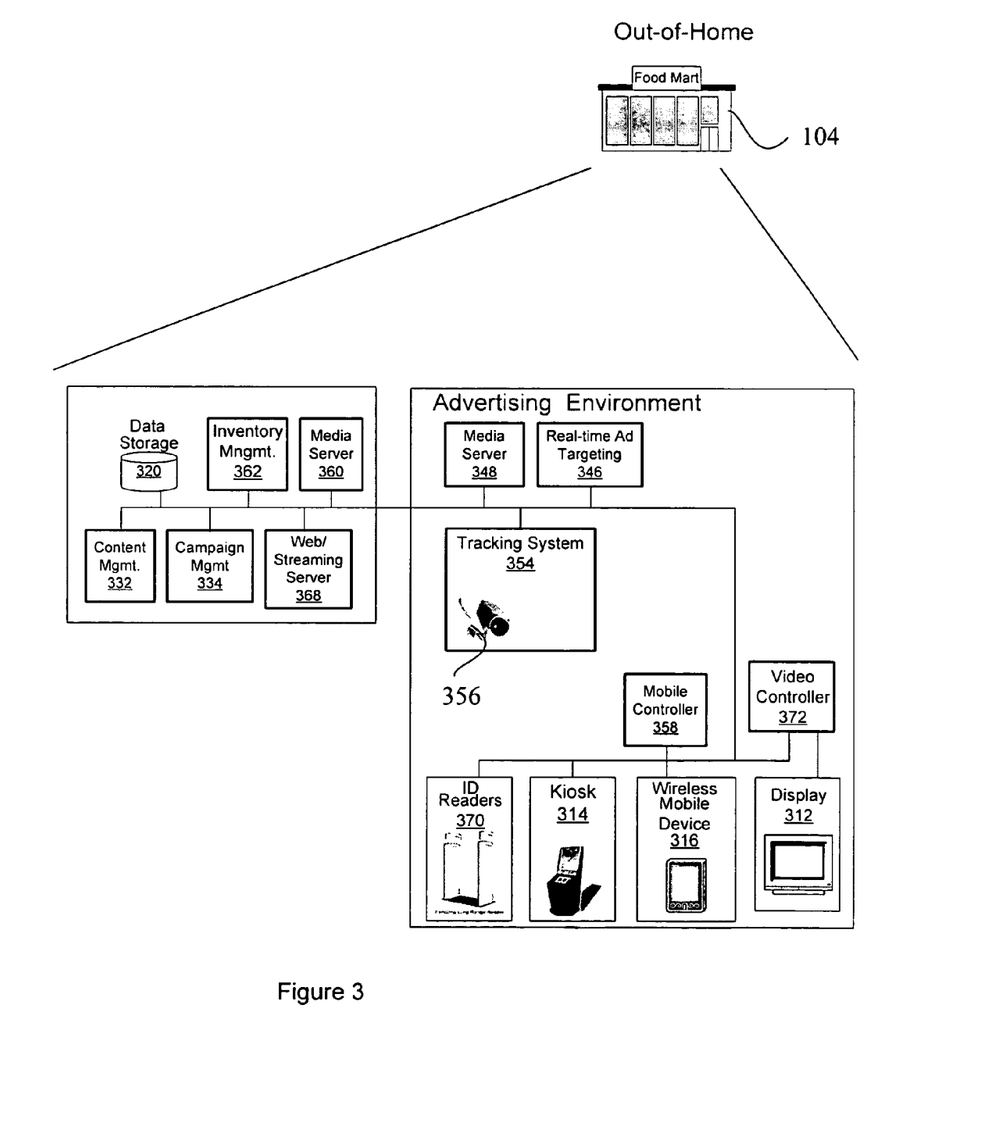
FIG. 3 illustrates an exemplary personalized marketing architecture for out-of-home personalized advertisements.

FIG. 3 illustrates an exemplary out-of-home embodiment for presenting personalized messages to a customer. The personalized marketing architecture may include a real-time marketing engine 346 to create or update a real-time customer profile. The customer profile may be stored on data storage device 320 and may include existing customer data and real-time data. The real-time marketing engine 346 may apply real-time analytics and business rules to provide high-impact offers substantially simultaneous with customer interaction in an advertising environment. The real-time marketing engine 346 may be used with statistical engines to determine advertising content, such as music to be delivered based on musical preferences of individuals within the space. An example of a real-time marketing engine includes the E.piphany Interaction Advisor 346.

A monitoring or tracking system 354 may recognize or personally detect, track and identify a customer in a public advertising environment. The tracking system 354 may track an individual or multiple individuals simultaneously. The tracking system 354 also may collect real-time data to provide more effective personalized advertising. The customer tracking system 354 may also detect and track an individual's location in a public advertising environment to determine where an individual spends time in the environment. The customer tracking system 354 may also detect and track an individual location based on permissions provided by the individual. The tracking system 354 may track the customer's movement within the advertising environment to record statistics, information and data associate with the customer. For example, a tracking system 354 may record the duration of time that a customer spends proximate to a merchandising display, in a portion of the store, or with a sales associate. The tracking system 354 may detect a customer response or a reaction to an advertising message or display. The customer profile may be updated or augmented based on the tracking information. The tracking information may be derived based on explicit information provided by a viewer of the video tracking system 354, and/or implicit information inferred or detected by the video tracking system 354.

The tracking system 354 may be a passive and/or active and may be fixed or portable. An active tracking system may require direct input form the customer, while a passive tracking system may automatically collect information based on customer data access permissions. Examples of tracking systems 354 configured to identify or recognize a customer include magnetic card readers, a radio-frequency identification (RFID) enabled system, a smart card systems, video systems, or any other monitoring mechanism that can locate identify an individual to identify a customer profile in the data storage device 320.

An example of an active identification system is a bar code system. A barcode encodes a unique identification number that may be read by a data processing device. The barcode may be printed on the individual's loyalty card, reward card, store credit card or the like. A barcode reader may be integrated with a kiosk 314. The bar code reader also may be integrated with a portable handheld device 316 that the user may carry within the monitored environment. The database 320 may store a customer profile associated with a unique identification number of the bar code on the customer's loyalty card. Using a barcode scanner, the customer may scan the barcode to read the encoded identification number and the record in the database associated with the identification number is located. This action may serve as the customer's authorization to collect their real-time data. Real-time data for the individual may be recorded and stored in the customer profile. For example, after the customer has been identified, real-time data may be recorded as the individual scans barcodes or UPC codes on products in a store to obtain information and compare prices and features. The data may be compiled in the record with customer data.

Passive identification systems include video capture and biometric scanning, and automated wireless communication through Bluetooth, WiFi, and RFID technologies. For example, the tracking system 354 may include one or more video cameras 356 that capture video images of the customer as the customer moves about the store. The customer may be recognized from the captured images. The customer profile may be located in a data storage device 320 based on identification of the customer by the tracking system 354.

A customer identification sensor 370 may also be used to identify a customer. The identification sensor 370 may detect a tag that is carried by the customer. The tracking tag associates a unique identification number with a customer profile. The sensor 370 may be located in public spaces such as at a store entrance, along a thoroughfare in a mall, at a sporting aren't and the like. The sensor may be located to identify an individual at a desired location the public spaces. The sensor 370 may read the unique identification number associated with the tracking tag and thereby identify the individual. The sensor 370 also may be integrated with or located proximate a kiosk 314 or displays 312. The willingness of the customer to carry a tracking tag may serve as the customer's authorization to collect their real-time data. The customer may access the web portal or a kiosk system to enable/disable the identity tracking as desired.

The tag may be an RFID enabled tag that may be read at a distance by an RFID reader 370. The RFID tag stores large amounts of data that may be read by RFID readers located within an advertising environment. The data may associate an individual with a unique identification number. The RFID tag may be integrated with a customer loyalty or awards card and with the products within the monitored environment. As the RFID tag passes an RFID reader 370, the identification number on the tag is read. The customer profile in the database 320 associated with the identification number may be located.

Examples of RFID systems including tags and readers are provided by Matrics, Omron, Texas Instruments, and AWID.

The sensors may be integrated with other monitoring systems to collect real-time data. For example, RFID readers may be placed throughout the monitored environment to calibrate a video tracking system 356. As the customer enters a store 306 with an RFID enabled loyalty card, the unique identification number stored on the RFID tag is read by a sensor 370 located at an entrance to the store 306. The video tracking system 354 also detects the customer. The identification read from the RFID tag is then linked with the video identification from the video tracking system 354.

With the video identification linked to the customer identification read from the RFID tag, the customer data stored in an individual profile on the database will be passed to the real-time advertising targeting engine 346. The individual may be monitored by the video tracking system 354 to collect real-time data and to present personalized advertising messages. For example, as the individual moves toward a video display 312 that is monitored by the video tracking camera 354, the individual is identified. The video display 312 may be cycling through images of static advertising content. The video tracking system 354 detects the individual proximate the video display 312, and after a predetermined or set amount of dwell time within a defined zone, may send a message to a media player system to play an advertising message that has been selected for the individual based on the unique identification number read by the sensor 370. If the individual leaves the video tracking area before the video has ended, the format automatically switches back to the default rotating static images. An example of a video tracking system that may be integrated with an RFID system includes the Censys3D by Point Grey Research and Universal Sport Amisco System.

A Bluetooth-enabled, cellular communications, or a WiFi device may be used to identify a customer. Bluetooth is a low-powered, wireless communications standard on a universally available frequency (e.g. 2.4 GHz). A WiFi device (IEEE 802.11b compliant device) is also a wireless device that communicates over a universally open frequency. A cellular communications device is a wireless radio communication device, such as a portable telephone. A cellular communications device may also be Bluetooth enabled. In a monitored environment, the Bluetooth, cellular, or WiFi-enabled device may communicate personal identification to a local monitoring system. The store may provide the Bluetooth, cellular or WiFi-enabled device or the user may already possess a device capable of communicating with the local monitoring system. The customer may have the ability to enable/disable tracking on their personal device as desired. The device may provide real-time information associated with the individual, such as where the individual is in the monitored environment. The Bluetooth, cellular, or WiFi-enabled device also may display personalized advertisements to the user. The Bluetooth-enable device may enable the user to purchase a product. For example, as the user approaches a merchandising display, advertisements may be communicated to and presented on the user's WiFi, cellular, or Bluetooth-enabled device. The user may use device to purchase a product, and the charges for may appear on the user next telephone bill or other automated billing mechanism. Examples of WiFi, cellular, Bluetooth-enabled devices include portable wireless telephones, cell phones, personal digital assistants (PDA's), personal gaming devices, and computer peripherals.

The customer may use a wireless mobile shopping assistant 316. The shopping assistant 316 may be a portable handheld device or may be integrated with a shopping cart or shopping basket. The shopping assistant 316 may be used to deliver private or highly granular advertising content without compromising personal information. The shopping assistant 316 may have a digital display for presenting textual, graphic, animation and video images. The shopping assistant 316 may deliver highly personalized advertisements and special offers in a context that maintains the user's privacy. For example, the shopping assistant 316 may display advertising messages for private items of interest to a customer or that are inappropriate to offer on large screens when the advertisements are not available to all customers. An example of a mobile display is provided by Symbol Technologies and integrates a bar code reader to scan products and identification cards. As a user scans products, the display presents information associated with those products and may present personalized advertising messages for related products. For example, if the user scans a small bottle of detergent the user may receive information indicating savings if the user purchases a larger bottle or fabric softener.

In an embodiment, the shopping assistant 316 has multimedia playback and wireless communication capability. The shopping assistant 316 wirelessly receives messages that are presented on the digital display. The multimedia playback functionality enables the shopping assistant 316 to play content rich advertising. The wireless functionality communicates data to and from the shopping assistant 316. The wireless functionality may provide for wirelessly receiving streaming video in addition to static images, short audio clips, and Flash animations. Macromedia ColdFusion MX may be used as an authoring tool for handheld devices.

The shopping assistant 316 also may detect the location and movement of the customer in the advertising environment. For example, the shopping assistant 316 may include a local position detection system that calculates the position and/or location of the shopping assistant 316 through triangulation to fixed sensors within the store environment. The local position detection system also may detect the position and/or location of the shopping assistant 316 through radio-frequency communication, or through any other method for detecting a position of a mobile device.

The shopping assistant 316 may wirelessly communicate with a mobile device controller 358. The controller 358 communicates with the shopping assistant 316 to receive and process data from the shopping assistant 316. The mobile device controller 358 may control the display of audio, textual, graphic, video messages or any combination thereof on the shopping assistant 316. Advertising messages may be identified and displayed on the shopping assistant 316 based on real-time data such as the customer's present location. An advertising message may be identified and presented to the customer on the shopping assistant based on the customer's past purchasing behavior, a stored shopping list and where the customer spent the most time or a substantial amount of time in the advertising environment. The advertising message may also be based on real-time information provided by a store's inventory management application 362 so that only information related to currently available items may be presented.

The controller 358 also may communicate with a local media server 348 and the real-time advertisement targeting engine 346. Although shown separately, the local media server 348 and real-time advertisement engine 346 may be single device. The local media server 348 may communicate with a remote or central media server 360. The remote media server 360 may be located within the store 306, or at physically separate location from the store 306, such as a corporate headquarters or a third-party. The remote media server 360 may serve other devices in the store or devices at other stores. The remote media server 360 may also communicate with the central inventory management server or application 362, the data storage device 320, a content management provider 332, a campaign management application 334 and a web/streaming content service provider 368. The local media server 348 may communicate directly with the remote media server 360 or through a network. The local media server 348 also may communicate with the central inventory management server or application 362, the data storage device 320, a content management provider 332, a campaign management application 334 and a web/streaming content service provider 368.

The customer also may use a kiosk 314 to receive information. The kiosk 314 allows the user to interact with the advertising content with a moderate level of privacy. Kiosks 314 may be centrally located of located throughout the advertising environment. The kiosk 314 may include a user a video display, one or more data input devices and one or more output devices. The kiosk 314 may have a controller to receive and process data and to provide data to an output device. The input devices may be a keyboard, keypad, optical character recognition device, video camera, bar code reader or scanner, a smart card reader, touch screen of the video display, a touch pad, mouse or computer pointer device, any combination thereof, or the like. The output device may be a printer, or a communication device. One or more kiosks 314 may be communicatively coupled through a network. The kiosk 314 also may be coupled to a remote and/or local server.

The kiosk 314 may provide information to the customer and allow the customer to input data. The kiosk 314 may provide various personalized services, including the ability to view, add to, and print shopping lists, make modifications to a customer profile, view infomercials, and view thumbnail images of advertisements that have been presented to the individual while in the monitored environment.

The kiosk 314 may present personalized advertising messages to the customer based on the real-time customer profile. The advertising message may take various forms and formats. For example, the advertising messages may be presented as a listing or thumbnail images of selections. The thumbnail images may include images that have been presented to the customer in the store environment and may include advertisements for items or services available at the store. The individual may select the thumbnail to review more information on those products and email this information to their personal email account. The customer may view How-To guides and modify a shopping list based on information provided at the kiosk 314. The kiosk 314 may print coupons and special promotions. The customer may also use the kiosk to forward an electronic version of an advertising message to a personal electronic mail account, such as an e-mail account provided at the store's website, by an Internet service provider, or other e-mail provider.

The kiosk 314 may have barcode readers for further product information and comparisons. Based on the identification and tracking system the customer will be immediately presented with personalized information on the kiosk screen when the customer approaches the screen. The content delivered to a kiosk may be dynamically generated HTML or Flash animations served from an application server. The streaming video content may be provided from a local or remote streaming media sever.

A customer may control the real-time data collection. For example, a customer may choose a privacy level that determines a level of monitoring an data collection. For example, a high level of privacy may restrict data collection, whereas a lower level of privacy may allow for additional monitoring and data collection. The customer also may choose complete privacy and turn off any monitoring. For example, the customer may access a controlled-access website to manage a customer profile or CAR for the customer. The customer may be granted access rights to view data in a CAR that has been collected, the types of data to be collected, the monitoring environments and the like. The customer may edit the data or customize the types of information that is collected. In an interactive environment, the customer may interact with the personalized marketing architecture to determine when or if a CAR or customer profile is to be updated with real-time data. For example, when a real-time advertising message is presented to the customer, the customer may chose to ignore the advertisement or to add information related to the advertising message to the customer's profile. The customer also may filter the types of advertising messages that are presented based on preferences. For example, the customer may select certain product categories that are of interest (e.g. HDTV, digital video recorders, etc) and deselect product categories that are not of interest or that have already been purchased.

The advertising messages may also be presented on video displays 312 in an advertising environment. The personalized video display 312 delivers or presents a personalized advertising message in a monitored environment. The personalized video display may be a large screen display, a handheld display, an interactive kiosk, or the like.

A large screen display 312 also may present advertising messages a public advertising environment. The large screen display 312 may be used to provide dynamic content that may include rotating static images, infomercials, and audio. The large screen displays 312 may be flat panel computer monitors, television screens, plasma screens or the like. A preferred large screen display is a plasma screen such as a widescreen (16:9 aspect ratio), true 1080i and 720p High Definition (HD) resolution flat panel video display. The video display 312 may be coupled to a video display controller 372. The video display controller may be a computer running a media player (such as Windows Media Player 9, or Real Player) or a TiVo®-like set-top box that is able to store and playback a playlist of videos. The video display 312 also may include a computer such configured to run Linux or Windows applications such as Windows Media Player 9 or Real Player. The video display 312 may be coupled for communication to a streaming media server. The communication mechanism between the media server 348 and the video display 312 may include the real-time advertising engine and may be a landline or a wireless communication. The landline may be a high speed Ethernet connection. The wireless may be a Wi-Fi or radio frequency connection.

The personalized marketing architecture also may include an inventory management system 362 that maintains information on inventory levels in a store 306. The inventory management system 362 also may provide information to determine which advertising message to present. For example, when inventory levels on a product rise above a predefined level, additional advertisements are displayed to promote that product. Inventory levels also may be correlated to statistics of foot traffic gathered by the tracking application 354 to optimize product placement within the store 306. The inventory may be maintained at the enterprise, region or store level. The inventory management system 362 may be maintained at a central location or may be distributed. Information on inventory levels may be communicated with the real-time advertisement targeting engine.

Figure 4:
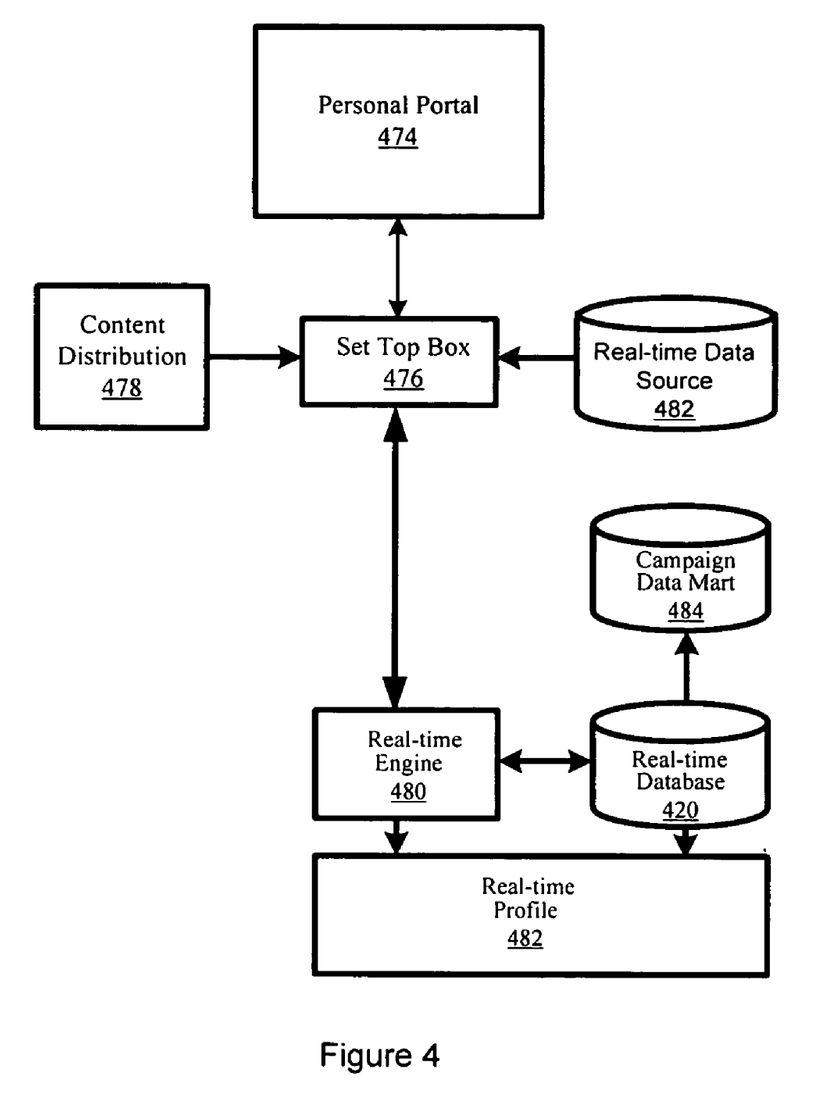
FIG. 4 depicts an exemplary personalized marketing architecture for in-home personalized advertisement.

FIG. 4 illustrates an embodiment for the personalized marketing architecture for presenting personalized advertising messages in an in-home environment. Personalized advertising messages may be presented on a personal media portal 474. The personal media portal 474 may be a television, a computer, a personal digital assistant, an electronic calendar, a security system, or the like. The personal portal also may allow a user to access on-line services and to browse personalized content. The user may review a customer profile to review purchase histories, shopping lists, product reviews, infomercials, how-to guides, and additional domain specific information. A personal profile may be modified through the on-line services and saved on the real-time profile 482. The real-time profile 482 may be stored in a repository to be used as an input to real-time advertising targeting engine 480 to determine the delivery of personalized advertising messages.

Advertising messages may be provided in multimedia formats including audio, video, animation, and static images. Personalized advertising messages may be delivered to a set-top box 476. For example, the personalized advertising messages may be delivered to the set-top box in real-time as part of a broadcast signal to be displayed on a television. The personalized advertising messages also may be delivered to the set-top box 476 may to be stored in a memory. The stored advertising messages may be selected and/or compiled based on a customer profile. The set-top box 476 may control the display of the personalized advertising messages on the personal portal 474. The set-top box 476 and/or portal 474 may record may collect and record real-time data as the customer watches a television program based on the customer's data access permissions. The data may include the customer's viewing behavior and/or patterns, amount of time the customer spent viewing a program or a specific channel, environmental data such as time of day, season, or weather, and program contents such as the current score of a sporting event, or outcome of a program. Customer and real-time data and information may be recorded in the in-home environment and stored in a real-time profile 482. The real-time data may be recorded in the in-home environment may be stored in the set-top box 476. The real-time data also may be stored in a real-time profile 482 for the customer.

Personalized advertising messages may be communicated to the set-top box 476 by a combination of a real-time engine 480 and a content distribution network 478. The content distribution network 478 may include a network of multiple media servers configured according to a type of media served. For example, the content delivered to the personal portal 474 may be dynamically generated web pages or streaming videos, animation, and images. The content distribution network 478 may include an application server that delivers dynamic web pages processing JSP, ASP, or PHP pages, and a media server that delivers audio and video content. The application server may a BEA Weblogic, Microsoft IIS, Apache, Oracle Application Server, or IBM Webshpere server. The streaming media files also may be delivered by an application server, or a dedicated streaming media server may be used to reduce load and provide functional separation. An example of dedicated streaming media application server called Macromedia ColdFusion MX includes tools that provide database connectivity, Web Services, and J2EE applications to deliver rich content to a variety of personal media portals 474, such as a handheld PDA and/or and television set-top boxes 476.

In an in-home embodiment, the personal marketing architecture employs digital advertisement insertion and video-on-demand to present personalized advertisements to a viewer during a television program. For example, a personalized advertisement is displayed on a portal 474 such as television located in a home. The personalized advertisement is displayed during a commercial break in a scheduled program.

While the program is broadcast on the television 474, real-time data are monitored by the set-top box 476, based on the customer's data access permissions. The real-time data is compiled with customer data to determine which commercial to present to the viewer. The viewer may configure the set-top box 476 to gather, record, and compile real-time data that may be used to present personalized advertisements.

The set-top-box 476 also may record data related the broadcast program and the environment. In an example, the program may be the NFL draft. As the draft gives way to a commercial break, the personalized marketing architecture determines a personalized advertisement to present to the viewer based on compiled real-time data. The compiled real-time data may include a viewer identification, the broadcast program (NFL Draft), current location in the program (spot in the draft), recent viewing pattern, the current weather, time of day and the like.

The set-top-box 476 communicates the real-time data to the real-time engine 480. The set-top box 476 also may communicate a request for a personalized advertisement based on the real-time data. The set-top box 476 also may compile customer data and pass the customer data along with the real-time data to the real-time engine 480. The real-time engine 480 combines the real-time data with the customer's data that may be stored in the database 420. The compiled real-time data and customer data may indicate, for example, the viewer's age (e.g. 35 years old), that the viewer has not purchased a videogame system or game in the past year from a particular vendor (e.g. the Retail Company) and that the viewer has spent time watching advertisements for plasma televisions over the past week. The compiled data may be used to create the customer's real-time profile or real-time CAR 482.

In an embodiment, the real-time engine 480 is configured to select an appropriate advertisement for the viewer. The real-time engine 480 runs a set of analytics against the real-time CAR 482. The analytics may include application of relevant business rules. Based on the result of the analytics, the real-time engine 482 may query the real-time database 420 to determine that the Retail Company's advertisement for a plasma television is the best or most appropriate advertisement to present. The real-time engine 480 may return an identifier for the Retail Company's advertisement to the set-top-box 476.

The set-top-box 476 receives the identifier from the real-time engine 480 and communicates a request for the advertisement to a content distribution network 478. The request may include a request for the creative work for the identified Retail Company's advertisement. For example, a request for the identified advertisement for the Retail Company's plasma television is sent to the content distribution network. The content distribution network 478 receives the request for the advertisement and returns the appropriate creative work to the set-top-box 476. The set-top-box 476 receives the advertisement for the Retail Company's plasma television and displays the advertisement on the television 474 during a scheduled break.

The viewer may request additional information about the plasma television being advertised. For example, through the set-top box 476 the user may request additional information. The set-top box 476 may send the request to the real-time engine 480 and the content distribution network. In response, the content distribution network 478 may communicate telescoping information to the set-top box. For example, the telescoping information may include a 3-minute vignette about the plasma television.

The customer also may select to purchase the plasma television from the Retail Company. The request to purchase the plasma television is captured by the set-top-box 476, and communicated to the Real-Time Engine 480. The real-time engine 480 may record the response information to better personalize future advertising to the viewer. The response information also may be used to better personalize advertisements to other viewers. The response information may also be communicated to the Retail Company's campaign data mart 484 to enable reporting on the return on investment (ROI), and success of the advertising spend/campaign.

In other embodiments, the portal 474 is configured as a smart device that provides customized services. For example, the portal 474 may provide an online wardrobe, online medicine cabinet, and virtual home improvement services. As online wardrobe, the portal 474 may sense Electronic Products Codes (EPC's) and/or remote sensors such as RFID tags, to monitor and identify wardrobe items. Such online wardrobe may be configured as described in U.S. Pat. No. 6,766, 947, entitled Real World Showroom, which is incorporated herein by reference in its entirety. Recommendations may be displayed on the media portal 474 about items that the user may desire, or recommendations on what items look good together based on the sensed wardrobe items. A portal 474 may include a video monitor or screen that is built into a closet or wardrobe.

As an online medicine cabinet, the portal 474 integrates RFID technology, touch screens, biometric scanners, and the online services with a medicine cabinet as described in U.S. Pat. No. 6,539,281, entitled Online Medicine Cabinet, which is incorporated by reference in it entirety herein. When a user approaches the portal 474, a biometric face recognition application recognizes the user and looks up the user's relevant medical information from a user controlled profile. When a medicine bottle is removed, the portal 474 may detect which bottle is removed by reading an RFID tags imbedded with the medicine bottle. If a wrong medicine bottle is removed a warning may be provided to the user. A suggestion also may be provided for an appropriate medication. The user also may review vital information such as blood pressure, pulse, or temperature with integrated equipment. If the portal 474 detects irregularities, information may be communicated to a medical professional, based on user data access permissions, using standard internet protocols (IP).

In a virtual home improvement services embodiment, wireless web cameras, voice recognition, micro-payments, and web services may be integrated with the portal 474 to help a user with household tasks. For example, if a user needs home repair assistance, such as rewiring an electrical outlet, the user may discover and call a list of experts that match a profile. The look up and discovery process is handled through web services. The individual may collaborate with the expert via voice and video images delivered from a wireless camera. A micro-payment system automatically charges the user's account.

Various embodiments of a personalized marketing architecture have been described and illustrated. However, the description and illustrations are by way of example only. Many more embodiments and implementations are possible within the scope of this invention and will be apparent to those of ordinary skill in the art. The various embodiments are not limited to the described environments, and can be applied to a wide variety of activities, including gaming, sporting events, education, and theatrical presentations. Accordingly, similar scenarios can be described in situations such as professional sporting events, movie theaters, seminars, or anywhere that a personalized message may be presented to an individual.

Both new and existing relationships may benefit from the interaction provided by embodiments of the personalized marketing architecture. Tailored, timely, interactive messages may decrease the amount of marketing needed to convert a prospective customer. Lower costs per new customer and higher response rates may result. A personalized marketing architecture may enable an organization to understand its customers' behavior, preferences, and intentions and to predict what and how to market. The personalized marketing architecture may adapt a presentation of video advertising in real-time based on scientific analytical models and business rules.

An embodiment of a real-time marketing system may use traffic tracking methods to vary advertising content on video displays. Content presented on a video display may be based on frequency, duration and preferences of customer traffic near a display. The personalized marketing architecture also may provide a personalized pricing tool to analyze and use real-time data related to customer buying habits.

In an embodiment, the personalized marketing architecture may use radio-frequency (RF) technology to determine what radio station is being received by or played in a car radio proximate to a sensor in a public area. The data may be collected along a highway to determine a popular radio station at particular moments and at a particular location. A real-time video advertisement may then be presented via a digital display such as a digital billboard. The real-time video advertisement may be processed to match known buying habits of the popular radio station's demographics.

In another example, an electronic calendar stored on a handheld device may be used to provide real-time data that is used to present personalized advertising messages. The calendar may record a business trip to Chicago in December. The stored information related to the business trip may be transmitted, based on the user data access permission profiles, and processed by a personalized marketing architecture. The personalized marketing architecture may process the information to provide information about predicted weather conditions on that date and advertisements for appropriate goods and services such as snow gloves, seasonal activities, or discount airline tickets to that destination.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

What is claimed is:

1. A merchandising system, comprising:
    (a) an automatic tracking device configured to identify an individual and to locate a data record associated with the individual in response to identifying the individual, the data record being updated according to real-time data associated with the identified individual according to data access permissions for a preconfigured privacy level selected by the individual from a plurality of stored privacy levels;
    (b) a content database configured to store multimedia content, the multimedia content being searchable according to metadata associated with the multimedia content;
    (c) a media server coupled with the content database and configured to query the database for desired multimedia content being identified in the content database based on identification of the individual and to communicate multimedia content in response to a request; and (d) a display communicatively coupled to the media content server and configured to present personalized multimedia content to the individual, being communicated to the display from the media server.

2. The system of claim 1 where the automatic tracking device includes a video camera configured to capture video images of the individual, according to the data access permissions for the individual.

3. The system of claim 2 where the automatic tracking device further includes a remote sensing device configured to read an identification tag associated with the individual, according to the data access permissions for the individual.

4. The system of claim 3 where the remote sensing device is an RFID reader.

5. The system of claim 3 where the video camera and remote sensing device track the movement of the individual within a monitoring environment.

6. The system of claim 5 where the video camera detects the individual proximate the display and the multimedia content is presented to the individual in response to detecting a dwell time of the individual proximate to the display.

7. The system of claim 6 where the multimedia content is an advertising message.

8. The system of claim 7 further comprising an input device configured to allow the individual to provide responses to the advertising message.

9. The system of claim 8 where the input device is any one of a touch screen of the display, a keyboard for a computing device, a keypad for a telephone, a keypad for a cellular telephone, a keypad for a personal gaming device, and a keypad for a personal digital assistant.

10. The system of claim 8 where the input device is a bar code scanner.

11. The system of claim 1 where the automatic tracking device is configured to collect real-time data related to the individual, according to the data access permissions for the individual.

12. The system of claim 11 where the real-time data is stored in a customer profile.

13. The system of claim 12 where the multimedia content is identified based on the customer profile.

14. The system of claim 1 where the display is a mobile display.

15. The system of claim 14 where the mobile display is a handheld device wirelessly coupled with the media server.

16. The system of claim 15 where the handheld device is configured to detect the instantaneous location of the handheld device, according to the data access permissions for the individual.

17. The system of claim 16 where the instantaneous location is recorded in a customer profile, according to the data access permissions for the individual.

18. The system of claim 17 where the multimedia content is identified based on the customer profile.

19. The system of claim 1 where the display is a home television.

20. The system of claim 1 where the automatic tracking device is a passive tracking device.

21. The system of claim 1 where the automatic tracking device is an active tracking device.

22. A merchandising device, comprising:
(a) a personal portal configured to present multimedia content to a viewer; and
(b) a controller configured to:
control multimedia content presented on the personal portal, wherein:
the controller communicatively is coupled to a real-time engine for requesting multimedia content to be presented with the personal portal;
the multimedia content is identified based on a real-time customer profile for the viewer;
the real-time customer profile including data associated with the viewer is collected and analyzed substantially simultaneously with determining a request for the multimedia content to be presented with a terminal; and
record viewing habits of the viewer viewing the multimedia content presented on the personal portal according to a preconfigured privacy level selected by the viewer from a plurality of stored privacy levels.

23. The merchandising device of claim 22 where the personal portal is any one of a television, a video display, a computer, a telephone, a personal digital assistant, and a personal gaming device.

24. The merchandising device of claim 22 where the real-time customer profile is updated based on the shared recorded viewing habits of the viewer.

25. A method for presenting personalized messages from a database of messages comprising:
identifying an individual with a monitoring mechanism in a monitored environment;
in response to identifying, recording real-time data associated with the individual in an electronic storage medium accessible by a data processing device;
selecting a message from an advertiser server to present to the individual based on the real-time data;
presenting the message on a display device in the monitored environment; and
augmenting a customer profile for the individual based on the real-time data according to a preconfigured privacy level selected by the individual from a plurality of stored privacy levels.

26. The method of claim 25 where the message is an advertising message.

27. The method of claim 25 where the message is presented at a kiosk in response to detecting the individual proximate the kiosk.

28. The method of claim 25 where the message is presented with a mobile device.

29. The method of claim 25 where the real-time data is collected substantially simultaneously as identifying the individual with the monitoring mechanism and selecting the message from the advertiser server.

30. The method of claim 25 where the real-time data is processed to generate a user profile.

31. The method of claim 30 where the collection of real-time data and generation of a user profile is controlled according to a user-selected setting.

* * * * *